(12) United States Patent
Lehmann

(10) Patent No.: US 6,487,176 B1
(45) Date of Patent: Nov. 26, 2002

(54) MEASURING METHOD AND MEASURING DEVICE FOR DATA COMMUNICATION NETWORKS

(75) Inventor: Erwin Lehmann, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/196,284

(22) Filed: Nov. 19, 1998

(30) Foreign Application Priority Data

Nov. 19, 1997 (DE) .......................................... 197 51 258

(51) Int. Cl.[7] .............................................. H04L 12/56
(52) U.S. Cl. ..................................... 370/252; 370/395.1
(58) Field of Search ................................ 370/395–399, 370/395.21, 395.3, 395.2, 395.31, 252, 395.1, 503, 504, 516–518

(56) References Cited

U.S. PATENT DOCUMENTS 5,477,549 A * 12/1995 Kamagata et al. ........ 370/395.1
5,680,425 A    10/1997 Morzano ...................... 377/26
5,778,001 A *  7/1998 Nakayama et al. .......... 370/516

FOREIGN PATENT DOCUMENTS

JP          4-291 855         10/1992

* cited by examiner

Primary Examiner—Chau Nguyen
Assistant Examiner—Ronald Abelson

(74) Attorney, Agent, or Firm—Kenyon & Kenyon

(57) ABSTRACT

Described are a measuring method and a measuring tool for data communications networks which make use of asynchronous transfer mode (ATM). At the receiving-side 19.44 Mbit/s parallel port of ATM transmission devices, ATM cells are present, which are composed, for example, of 53 eight-bit width data words, whose 47 useful signal words (payload) originate from originally synchronous digital data strings, whose frequency is determined by the bit rate of the originally synchronous digital data strings, and which permit the cell-by-cell reading out of the payload data, which are fed consecutively and at a higher rate as burst data to a data test receiver, which can ascertain the correct or corrupted receipt of the transmitting-side data, without the need for a timing recovery circuit on the receiving side, so that the measurements can be performed using a constant bit rate and a variable bit rate of the originally synchronous digital data strings. The ATM measuring tool includes an ATM evaluation circuit (2), from which 47 payload data words are extracted from the 53 data words of each valid ATM cell and are fed with the aid of a 19.44 Mbit/s clocked write signal to the data inputs (d0 through d7) of a memory (3), and includes a clocked burst data generator (6), which in this case uses one eighth of the 19.44 Mbit/s clock pulse to control the reading out of the memory (3) and the parallel loading of the payload data words into a parallel-to-serial converter (4) and, moreover, emits a 19.44 Mbit/s burst clock pulse at the output (19). The converted serial data are supplied as clocked data to a burst-data output (5). Each data burst and the associated clock-pulse burst are emitted externally to outputs (18 or 19) and fed as a received signal to a data measuring receiver.

19 Claims, 2 Drawing Sheets

MEASURING METHOD AND MEASURING DEVICE FOR DATA COMMUNICATION NETWORKS

FIELD OF THE INVENTION

The present invention is generally directed to a measuring method and a measuring device for data communications networks which use asynchronous transfer mode (ATM).

RELATED TECHNOLOGY

ATM transfer systems are known, which are used to transmit synchronous digital signal strings, existing, for example, as digitized voice, digitized music, digitized images, or as a binary series of numbers, that have been split up into eight-bit-width data words and combined into packets; data packets of this kind are the payload of ATM cells. The AAL 1 format (ATM Adaptation Layer 1) is a customary cell format for transmitting synchronous data over ATM systems at a constant bit rate (CBR=constant bit rate). An AAL1 cell has 53 data words of eight bit length, i.e. 53 octets or bytes, of which five data words form the cell header, and another data word is used for numbering the data packet. 47 data words thus remain for the payload of the cell.

On the transmitting side, synchronous digital data strings are able to be easily converted into ATM cells. Since it is the transmission system, nowadays predominantly a fiber optic system of the so-called "synchronous digital hierarchy" (SDH) including the most frequently occurring STM1-interface, which predefines the transmitting bit rate of 155.52 Mbit/s, quite a few data systems employing the most frequently used synchronous transmission rate of 2.048 Mbit/s are able to be inserted into such an ATM transmission system. The individual 2.048 Mbit/s systems are distinguished by their individual cell header contents and can be reassigned later to the correct receiver.

Given a less than fully utilized transmission capacity over a 155.52 Mbit/s transmission route, it is possible to insert about 72 ATM cells of other users or idle cells into the gaps between two 2.048 Mbit/s payload cells of one specific data stream. Splitting the synchronous data stream into eight-bit words, as required in ATM cell formation, reduces the rate of the word clock or block clock in the processing and retransmission of signals at the parallel port to one eighth of 155.52 Mbit/s, resulting in 19.44 Mbit/s and facilitating the use of more highly integrated switch elements.

Greater difficulties have to be overcome on the receiving side to retrieve the original digital data string from the ATM cells of a specific data stream, because it is necessary to recover the synchronous data timing or clock. Clock recovery circuits require reference oscillators, whose frequency can be variably tuned within certain limits by the incoming line signal. VCOs (voltage controlled oscillators) are used to perform the variable tuning.

As long as the synchronous digital data strings continue to be transmitted at 2.048 Mbit/s, the receiver's clock recovery circuit, equipped with an appropriate VCO, is properly set up for reconverting the incoming ATM cells. However, as soon as a lower or higher transmission rate is needed, for example in world-wide data communication traffic based on a customary, yet different, U.S. or Japanese standard, the variety of measuring methods is restricted by the availability of reference oscillators. Assuming it takes about eight weeks to acquire VCO modules to retrofit an ATM measuring instrument, a measurement could be delayed by this period of time, in the event of an urgently needed conversion.

An even greater problem is posed by payload measuring procedures when working with VBR data strings (VBR= variable bit rate), thus when the data that arise require a variable transmission rate. This is the case when working with MPEG encoded digitized television pictures, where the required transmission rate is a function of the changes in the differential-encoded picture content over time. Also the transmission of voice over ATM systems raises this measuring problem, because digitized voice transmission can occur with a transmission rate substantially lower than 2.048 Mbit/s.

Therefore, in the case of VBR data strings, the measuring procedure does well enough with ATM cell-oriented measuring methods; cell losses are registered using cell header data and mostly output as cell loss rates. However, ATM operating companies are obligated to transmit their customers'data and are asked about the quality of their networks with respect to these data. This customer data are inserted in the payload portion of the ATM cells. Therefore, a method for measuring the payload data is required, even when it is only a question of representing the time distribution of ATM cell losses in detail, cell for cell, to facilitate application of suitable error correction methods.

SUMMARY OF THE INVENTION

An object of the invention is to devise a measuring method and a measuring device for the asynchronous transfer mode used in telecommunications networks which functions without recovering the original synchronous data timing. This permits flexibility within the transmission rate of the synchronous customer data and that the measuring process also works with the variable bit rate of the original, synchronous digital data strings.

The present invention provides a measuring method for data communications networks which makes use of asynchronous transfer mode (ATM) for continuous payload measurements, particularly at a 19.44 Mbit/s parallel port of ATM transmission devices where ATM cells are applied. The cells in this case are composed of 53 eight-bit width data words, and whose 47 useful signal words (payload) originate from originally synchronous digital data strings, whose frequency (rate of occurrence) is determined by the bit rate of the originally synchronous digital data, and which permit the cell-by-cell reading out of the payload data. The payload data are fed consecutively and at a higher rate as burst data to a data test receiver, which is able to ascertain the correct or corrupted receipt of the transmitting-side data. The parallel data (DA0 through DA7) arrive together with a 19.44 Mbit/s block clock pulse (7) and a cell starting pulse (10) in an ATM cell evaluation circuit (2); in the evaluation circuit, the 47 payload words are extracted from the altogether 53 words of each valid ATM cell and are fed to data inputs (d0 through d7) of a memory (3). With the aid of a timed write signal (11), which is fed by the ATM cell evaluation circuit (2) to the memory input for the write signal (11), the 47 payload words are then read in one after another into the memory (3). The memory (3) indicates at which instant the cell contents are available and uses an empty flag signal (13) as a filling level indicator to start a clocked burst data generator (6), which is also timed by the block clock pulse (12). The generator uses the block clock pulse to produce different pulse bursts on separate lines (for example 14, 15, 16 and 19). With the aid of the first clock-pulse burst, the 47 payload words are read out one after another out of memory (3) and fed to the parallel inputs of a parallel-to-serial converter (4). This parallel-to-serial converter is supplied at its input (16) for shift/load signals with a specific number (in this case 47) of load pulses and, at its clock-pulse input (15), with clock pulses (in this case with eight times 47), which were produced as second and third pulse bursts. At a serial output (17), the parallel-to-serial converter relays, in the rhythm of the clock pulses, the payload data of an ATM cell to burst-data output (5), at a serial output (18) of the output (5).

Additional features or refinements of the present method include that the write signal (11) is clocked using the block clock pulse (7). The clocked burst data generator (6) is either likewise supplied with the block clock pulse (12) or, in an alternative embodiment, with a higher-rate block clock pulse via the clock-pulse supplier (20), with whose aid the clocked burst data generator (6) produces a specific number, in particular three different pulse bursts of the same duration. With the aid of the first clock-pulse burst, which is fed to the read-out control input (14) of the memory (3), the useful signal payload words (here 47) are read one after another via outputs (D0 through D7) out of the memory (3) and fed to the parallel inputs of the parallel-to-serial converter (4). In a manner suitable for the readout process, the parallel-to-serial converter (4) is supplied at its input (16) for the shift/load signals with corresponding load pulses (here 47) and, at its clock-pulse input (15), with a corresponding number (here with eight times 47) clock-pulses of the 19.44 Mbit/s clock pulse (12), which were produced as second and third pulse bursts by the clock-pulse burst generator (6). At its serial output (17), the parallel-to-serial converter (4) relays, in the rhythm of the clock-pulses, the payload data of an ATM cell to burst data output (5), and these data bursts and clock-pulse bursts (here 376 bit long) represent, ATM cell for ATM cell, consecutively, the originally synchronous transmitting measuring data, and are compared in the measuring receiver on a bit by bit basis to a synchronizable reference signal, and are continually supplied as a comparison result to the designated result protocol.

Another refinement includes that, to increase the clock-pulse of data being output to output (19), a higher-rate block clock-pulse supplier (20) is provided. The memory (3) indicates at its output (13) when cell contents are available, and starts clock-pulse burst generator (6), which works with the increased block clock-pulse of, for example, 42.0 Mbit per second, resulting in the generation of three different pulse bursts of the same duration, here, namely, a burst having 47 pulses in 5.25 Mbit/s rhythm on read line (14), a clock-pulse burst having eight-times 47 pulses in the 42.0 Mbit/s rhythm to input (15), and a pulse burst clocked in a 42.0 Mbit/s rhythm as load/shift signal to input (16) of the parallel-to-serial converter (4). The transmission rate within the output bursts may be increased from 19.44 to 42.0 Mbit/s; and only a time period of three idle cells may still be needed as a gap between the two valid ATM cells at the parallel port for switching on the ATM measuring tool (1), so that the originally synchronous transmitting-side transmission rate rises to maximally 35 Mbit/s. Alternatively, by using a fast-action switching circuit technique, such as ECL, for the parallel-to-serial converter (4), the clock-pulse burst generator (6), and the burst data output (5), one increases the transmission rate within the output burst from 19.44 to over 140 Mbit/s; then no gap exists between two valid ATM cells at the parallel port for switching on the ATM measuring tool (1), and as a result, the originally synchronous transmitting-side transmission rate rises to maximally 140 Mbit/s.

A still further refinement of the present method is that the measuring tool (1) is switched on at a point on the transmission route where the ATM data signals are available in 8-bit parallel, with a cell starting pulse signal (10), an 8-bit block clock pulse and, in some instances, with an idle cell identifier, or an identifier for the valid cells. At the output of the memory (3), the 8-bit data words are read out with one eighth of the block clock pulse and supplied to the parallel-to-serial converter (4), to be read out there serially using the block clock pulse. For each valid ATM cell, a data burst of the length of the number of payload bits contained therein and, matching this, a block clock-pulse synchronous clock-pulse burst of the same length is emitted by a clock output circuit (6). The synchronous data/clock bursts are supplied from the ATM measuring tool (1) to the data/clock-pulse inputs of a data measuring receiver.

The present invention also provides a measuring tool or device, in particular for implementing the present method, wherein parallel data (DA0 through DA7), a block clock pulse (7), a void cell identifier signal (8), and an identifier for valid cells (9) are switched to the input of an ATM cell evaluation circuit (2). The output of the ATM cell evaluation circuit (2) is linked to a memory (3) and via a block clock-pulse supplier (12) to a clock-pulse burst generator (6). Connected in outgoing circuit to memory (3) is a parallel-to-serial converter (4), which is timed and controlled (15 and 16) by clock-pulse burst generator (6) and which, in turn, is linked by its output (17) to a circuit of a burst-data output (5), at whose serial output (18) data are adapted to be tapped off for the data measuring receiver. Clock-pulse burst generator (6) receives an empty flag signal (13) from memory (3), and is linked to the input (16) of the serial-to-parallel converter (4) for the shift/load signal, as well as emits externally via the clock-pulse burst output (19) clock-pulse bursts matching the data, to the data measuring receiver.

Advantageous refinements include: (a) that to read the memory (3), the memory is linked to a clock-pulse (20) having a higher rate than the eighth clock pulse, enabling the time interval between two successive, valid ATM cells to be less than seven idle cells; (b) that the measuring tool is implemented using integrated circuit technology; (c) the measuring tool (1) is part of an ATM measuring instrument; and (d) the measuring tool (1) is part of a data measuring instrument.

According to the present invention, the received data, which are contained in each ATM cell and come from the original, continuous, synchronous digital data string, are able to be supplied at a higher rate and as bursts of data to the data measuring instrument, so that one can dispense entirely with the difficult clock recovery, since the data measuring instrument used here is suited for such a burst transmission operation. The measuring device fits on the receiving-side 19.44 Mbit/s parallel port of ATM transmission devices. It is there that ATM cells are applied. The ATM cells are composed of 53 eight-bit width data words, whose 47 useful signal words (payload) originated from originally synchronous digital data strings, whose frequency is determined by the bit rate of the originally synchronous digital data strings, and which permit the cell-by-cell reading out of the payload data. The payload data are fed consecutively and at a higher rate as burst data to a data test measuring receiver, which can ascertain the correct or corrupted receipt of the transmitting-side data without the need for a clock recovery circuit on the receiving side. Thus, measurements can be performed not only using a constant bit rate, but also with a variable bit rate of the originally synchronous digital data strings.

BRIEF DESCRIPTION OF THE DRAWINGS

The present invention is described on the basis of cost-effective exemplary embodiments, which are represented in the drawing, in which.

DETAILED DESCRIPTION

Figure 1:
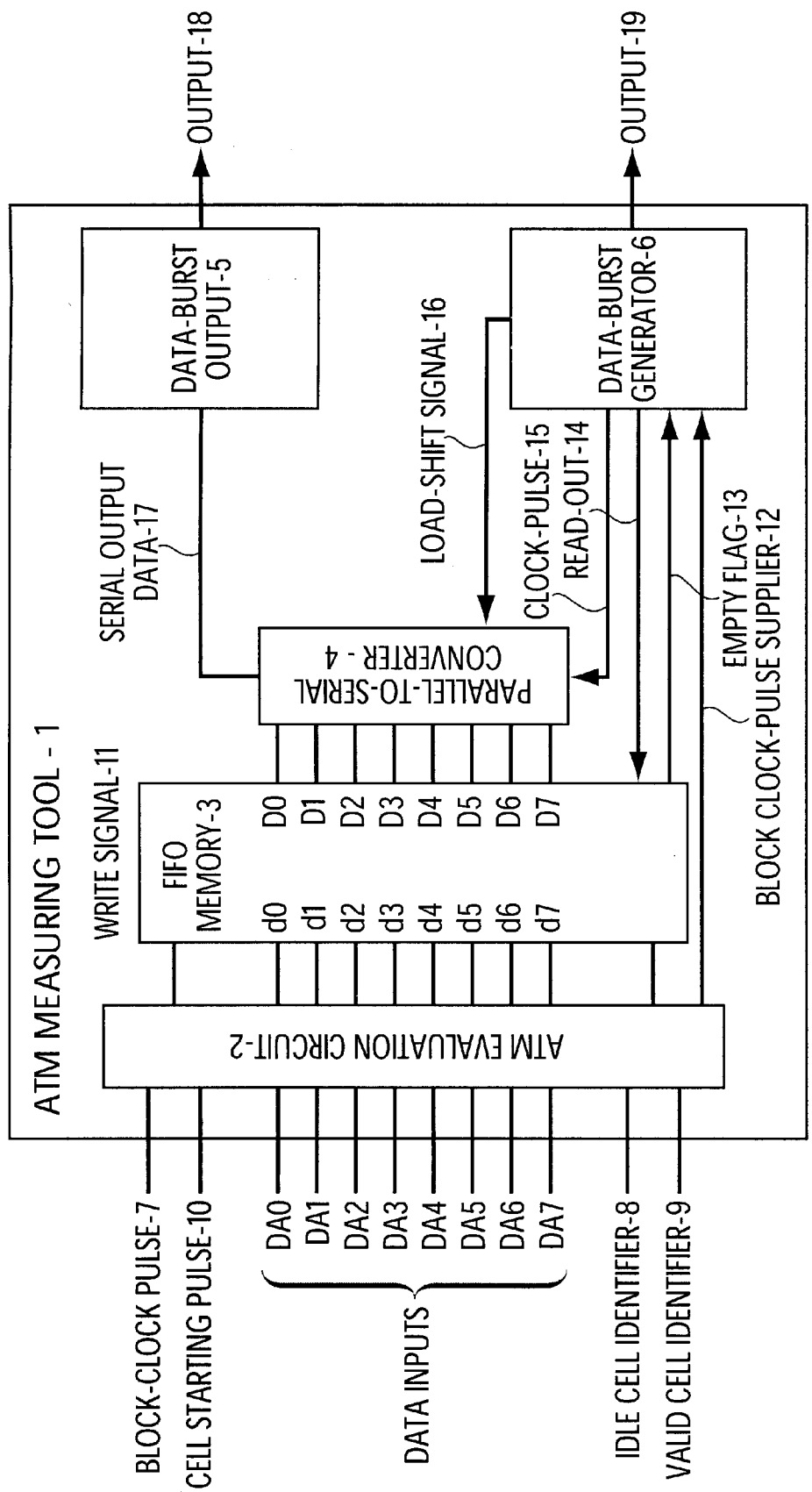
FIG. 1. shows a block diagram of a basic circuit of an ATM measuring tool or of an ATM measuring device.

FIG. 1. reveals the principle of the ATM measuring tool. One starts out from the originally synchronous binary measuring data, which have a transmission rate in the range of less than 64 kbit/s up to 16 Mbit/s, and may fluctuate back and forth within this range. Customary as binary measuring data in data measuring equipment are pseudo-random sequences. It is furthermore assumed that the measuring data are packaged on the transmitting side in known fashion, in ATM cells of the AAL1 format, and are serially transmitted over the transmission path or link (optical fiber, cable or radio propagation path) at 155.52 Mbit/s, or are transmitted into the ATM terminals at 19.44 Mbit/s 8-bit parallel.

The receiving-side interface point for the ATM measuring tool 1 of the present invention is the parallel port (not shown) of a customary ATM transmission unit, from where the 53 eight-bit width data words (octets) of the ATM cells can be tapped off in the rhythm of the appropriate 19.44 Mbit/s block clock or timing 7. The usual marking of the cell beginning is expected at the ATM parallel port, thus a cell starting pulse 10 of the duration of a block clock-pulse period is provided in the case of the first data word of the ATM cell. When idle cells are inserted at the interface point between the ATM cells, which contain the measuring signal, then an identifier is also necessary for the valid cells 9 or an idle cell identifier 8 as a pulse signal.

The eight parallel data (DA0 through DA7) arrive together with 19.44 Mbit/s block clock pulse 7 and cell starting pulse 10 in ATM cell evaluation circuit 2, where the 47 payload words are extracted from the altogether 53 words of each valid ATM cell and are fed to data inputs (d0 through d7) of FIFO memory 3. With the aid of a write signal 11, which is timed at 19.44 Mbit/s and is fed by ATM cell evaluation circuit 2 to the FIFO memory input for write signal 11, the 47 payload words are read one after another into FIFO memory 3.

FIFO memory 3 indicates when cell contents are available and uses an empty flag signal 13 as a filling level indicator to start clocked burst data generator 6, which is also supplied with 19.44 Mbit/s block clock pulse 12, which it uses to produce three different pulse bursts of the same duration:

- a FIFO read-out burst having 47 pulses in 2.43 Mbit/s rhythm (equal to one eighth of the 19.44 Mbit/s rate) on read line 14;
- a clock-pulse burst having eight times 47, equal to 376, pulses in the 19.44 Mbit/s rhythm to outputs 15 and 19 for the clock pulse; and
- a pulse burst (1 bit low signal, 7 bits high signal) timed at 19.44 Mbit/s as load/shift signal to output 16. With the aid of the first clock-pulse burst (2.43 Mbit/s), which is supplied by clock-pulse burst generator 6 to read-out control input 14 of FIFO memory 3, the 47 payload words are read out one after another via outputs D0 through D7 out of FIFO memory 3 and fed to the parallel inputs of parallel-to-serial converter 4.

In a manner suitable for the FIFO memory readout process, parallel-to-serial converter 4 is supplied at its input 16 for shift/load signals with 47 load pulses and, at its clock-pulse input 15, with eight times 47, equal to 376, clock pulses of the 19.44 Mbit/s clock pulse, which were produced as third and second pulse bursts by clock-pulse burst generator 6.

At its serial output 17, parallel-to-serial converter 4 relays, in the rhythm of the 376 clock pulses, the payload data of an ATM cell to burst-data output 5, which is essentially made up of a line driver (not shown), for transferring the data to the subsequent data measuring receiver. Clock-pulse burst generator 6 has a substantially identical line driver, via which the clock pulse is output to the downstream data measuring receiver in a way that ensures that it matches the data.

The 376-bit long data bursts and clock-pulse bursts represent as ATM cell for ATM cell, consecutively, the originally synchronous transmitted measuring data, and can be compared on a bit by bit basis to a synchronizable reference signal and be continually supplied as a comparison result to the designated result protocol.

To obtain meaningful measuring results, a data measuring receiver is needed, which does not recognize the gaps in the receiving sequence of the rapid data/clock-pulse bursts as a breakdown in the transmission route ("signal loss" or "clock-pulse loss"), but rather simply continues to measure and compare further and, in response to a clock-pulse shift (slip), recognizes the lost synchronism from the data signal, and is then able to resynchronize in spite of gaps. This is easily feasible from a technical standpoint, as there are such measuring instruments, and there are also instruments, which, in spite of gaps in the receiving sequence, are able to record bit-error structures, which one can use to properly place ATM cell losses, precisely in terms of bits, into the correctly received data, as is also customary when working with continuous, synchronous data transmission.

To use the described ATM measuring tool, the factor eight, i.e., the factor by which the FIFO memory-write process is faster than the FIFO memory-read process, requires that the originally synchronous transmission data, thus the data not in burst form, not be supplied with a rate of higher than about 16 Mbit/s, so as to ensure that a gap of the duration of seven idle cells remains available in the ATM cell sequence, to be able to control the parallel-to-serial converter 4 using the 19.44 Mbit/s block clock pulse. This results, above all, in the advantage of a cost-effective data conversion, because an additional oscillator module is not needed, as the 19.44 Mbit/s block clock pulse 7, which is already adapted to be tapped off anyway, can be used for the data conversion.

Figure 2:
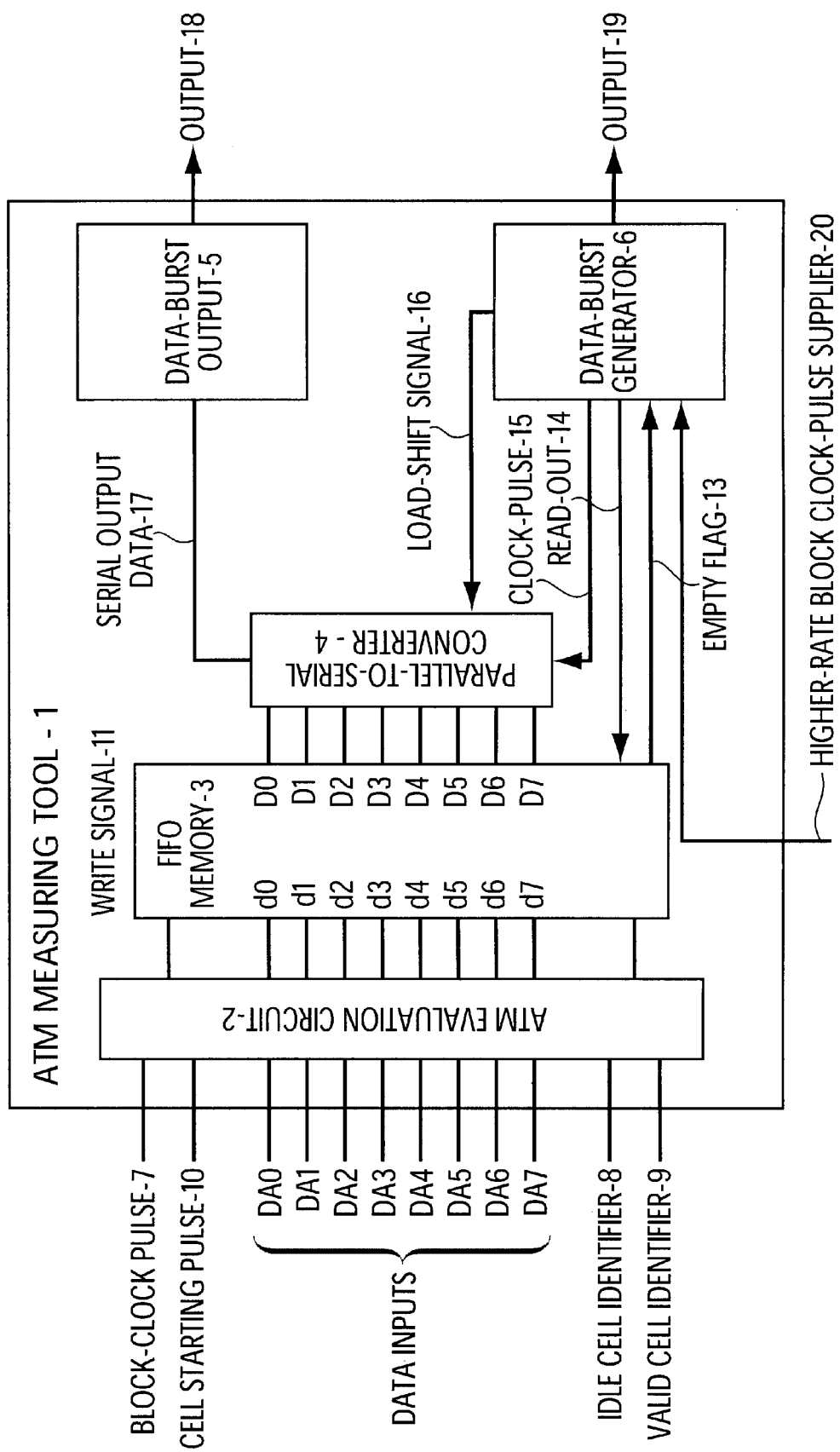
FIG. 2. shows another block diagram of a modified ATM measuring tool or of an ATM measuring device.

A further embodiment of the present invention is shown by the modified ATM measuring tool of FIG. 2.

To achieve a data-output clock pulse of more than 19.44 Mbit/s at output 19, and thus synchronous transmission rates of more than about 16 Mbit/s, the 19.44 Mbit/s block clock-pulse supplying 12 of the first exemplary embodiment must be replaced by a higher-rate block clock-pulse supplier 20, which can stem from an additional oscillator on ATM measuring tool 1 or from an external clock-pulse source. In the embodiment of the circuit according to FIG. 2, for example, a read-out block clock pulse of 42.0 Mbit/s is supplied, which permits synchronous measurements at a variable rate up to the important PCB transmission rate of 34.368 Mbit/s.

As in the first exemplary embodiment, FIFO memory 3 indicates at its output 13 (empty flag), when cell contents are available, and starts clock-pulse burst generator 6, which at this point works with the increased block clock-pulse of 42.0 Mbit/s, which it uses to produce three different pulse bursts of the same duration, as in the first exemplary embodiment:

- a FIFO memory read-out burst having 47 pulses in 5.25 Mbit/s rhythm (equals one eighth of the 42.0 Mbit/s rate) on read line 14;

a clock-pulse burst having eight-times 47, equal to 376 pulses in the 42.0 Mbit/s rhythm at output 15; and a clock-pulse burst clocked with a 42.0 Mbit/s rhythm (1 bit low signal, 7 bits high signal) as load/shift signal at output 16. The parallel-serial conversion and the outputting of the 376 bit long data bursts and clock-pulse bursts follows after that in the same way as in the first exemplary embodiment according to FIG. 1, merely the transmission rate within the output bursts of 19.44 increasing to 42.0 Mbit/s. Only a time period of three idle cells is still needed as a gap between the two valid ATM cells at the parallel port for switching on ATM measuring tool 1, so that the originally synchronous transmitting-side transmission rate can rise to maximally about 35 Mbit/s.

When still higher synchronous transmission rates need to be measured using ATM measuring tool 1 of the present invention, the data gap between two valid ATM cells will become still smaller or disappear completely. Besides the still higher-rate additional oscillator in ATM measuring tool 1, additional circuit-engineering outlay would be required due to the use of a faster circuit family in parallel-to-serial converter 4, in data-burst output 5, and in clock-pulse burst generator 6. For this, the otherwise usual CMOS or TTL switching circuits are replaced by faster-acting ECL switching circuits (ECL=emitter coupled logic). The replacement then places other demands on the power supply of ATM measuring tool 1 (instead of just +5 volts, additionally −5 volts), and on the ECL capability of the downstream data-measuring receiver for the ECL signal reception.

Using such an ATM measuring tool, however, makes it possible to fulfill all requirements for an unencumbered change in the transmission rate and for data specific fluctuations in the transmission rate within a range that extends from 64 kbit/s up to 140 Mbit/s, thus that extends up to the highest transmittable rates in the asynchronous transmission mode. The present invention enables all originally synchronous data signals to be measured at one ATM parallel port, without the need for the appropriate data timing recovery in each case.

LIST OF REFERENCE SYMBOLS

1 ATM measuring tool or device
2 ATM cell-evaluation circuit
3 FIFO memory (first-in first-out)
4 Parallel-to-serial converter
5 Burst data output
6 Clock-pulse burst generator
7 Block clock pulse
8 Idle cell identifier
9 Valid cell indication
10 Cell starting pulse
11 Write signal
12 Block clock-pulse supplying
13 Empty flag
14 Read line
15 Input for Block clock pulse
16 Input for shift/load signal
17 Output for serial data
18 Serial output (for data to the data measuring receiver)
19 Output (for clock pulse to the data measuring receiver)
20 Higher-rate clock-pulse supplier

What is claimed is:

1. A measuring method for data communications networks using ATM cells, the ATM cells having 53 eight-bit width data words with 47 of the 53 data words being payload data from originally synchronous digital data strings, a cell-by-cell reading out of the payload data being possible so as to be fed consecutively as burst data to a data test receiver, the data test receiver being able to ascertain a correct or corrupted receipt of transmitted data, the method comprising:

receiving parallel data together with a first block clock pulse of 19.44 Mbit/s and a cell starting pulse in an ATM cell evaluation circuit;

extracting the payload data of each ATM cell and feeding the payload data to data inputs of a memory;

reading the 47 data words of the payload data of each ATM cell one after another into the memory using a timed write signal, the write signal being fed by the ATM cell evaluation circuit to the memory, the memory having a write signal input for the write signal;

starting a clock-pulse burst generator as a function of a filling level of the memory, the clock-pulse burst generator being timed by a second block clock pulse so as to produce a first clock-pulse burst, a second clock-pulse burst and a third clock-pulse burst;

reading out the 47 data words of the payload data using the first clock-pulse burst, the 47 data words being read out one after another out of the memory and being fed to parallel inputs of a parallel-to-serial converter;

supplying the parallel-to-serial converter at a load input for shift/load signals with a specific number of load pulses and supplying the parallel-to-serial converter at a clock-pulse input with clock pulses, the clock pulses and the load pulses being produced by the second and third clock-pulse bursts; and relaying the payload data from a serial output of the parallel-to-serial converter to a burst-data output in a rhythm of the clock pulses.

2. The method as recited in claim 1 wherein the write signal is clocked using the second block clock pulse, the second block clock pulse being at a same rate as the first block clock pulse.

3. The method as recited in claim 1 wherein the write signal is clocked using the second block clock pulse, the second block clock pulse being at a higher rate than the first block clock pulse and the second block clock pulse being supplied by a clock-pulse supplier.

4. The method as recited in claim 1 wherein the first, second and third clock pulse bursts are of the same duration.

5. The method as recited in claim 1 wherein the specific number of load pulses is 47 and is produced by the third clock-pulse burst and 376 of the clock pulses are produced by the second clock-pulse burst within a same time as the third clock-pulse burst.

6. The method as recited in claim 1 further comprising comparing the burst-data output representing the payload data of consecutive ATM cells with a synchronizable reference signal.

7. The method as recited in claim 3 wherein the higher rate is 42.0 Mbit per second.

8. The method as recited in claim 7 wherein with a certain time the first clock-pulse burst has 47 pulses in a 5.25 Mbit/s rhythm, the second clock-pulse burst has 376 pulses in a 42.0 Mbit/s rhythm, and the third clock-pulse burst is clocked in the 42.0 Mbit/s rhythm.

9. The method as recited in claim 7 wherein a transmission rate of the burst-data output is 42.0 Mbit/s; and only a time period of three idle cells is required as a gap between two valid ATM cells, so that an originally synchronous transmitting-side transmission rate rises to a maximum 35 Mbit/s.

10. The method as recited in claim 7 further comprising using a fast-action switching circuit technique for the parallel-to-serial converter, the clock-pulse burst generator, and the burst data output to increase a transmission rate of the burst data output from 19.44 to over 140 Mbit/s, no gaps being required between two valid ATM cells so that an originally synchronous transmitting-side transmission rate rises to a maximum of 140 Mbit/s.

11. The method as recited in claims 1 wherein the method is performed on a transmission route where ATM data signals are available in 8-bit parallel, and wherein the data words are read out of the memory with one eighth of the second block clock and are read out of the parallel-to-serial converter using the second block clock-pulse and further comprising emitting a block clock-pulse synchronous burst of the same length as a number of payload bits contained in each ATM cell through a clock output circuit to a data measuring receiver.

12. The method as recited in claim 1 further comprising identifying which ATM cells are valid.

13. A measuring method for data communications networks using ATM cells, the ATM cells including payload data from originally synchronous digital data strings, the method comprising:

receiving parallel data together with a first block clock-pulse of 19.44 Mbit/s and a cell starting pulse in an ATM cell evaluation circuit;

extracting the payload data of each ATM cell and feeding the payload data to data inputs of a memory;

reading the payload data of each ATM cell into the memory using a timed write signal, the write signal being fed by the ATM cell evaluation circuit to the memory, the memory having a write signal input for the write signal;

starting a clock-pule burst generator as a function of a filling level of the memory, the clock-pulse burst generator being timed by a second block clock pulse of more than 19.44 Mbit/s so as to produce a first clock-pulse burst, a second clock-pulse burst and a third clock-pulse burst;

reading out the payload data from the memory using the first clock-pulse and feeding the payload data to parallel inputs of a parallel-to-serial converter;

supplying the parallel-to-serial converter at a load input for shift/load signals with a specific number of load pulses and supplying the parallel-to-serial converter at a clock-pulse input with clock-pulses, the clock-pulses and the load pulses being produced by the second and third clock-pulse bursts; and relaying the payload data from a serial output of the parallel-to-serial converter to a burst-data output.

14. A measuring tool for ATM cell evaluation comprising:

an ATM cell evaluation circuit having inputs for parallel data, for a first block clock pulse, for an idle cell indication signal, and for an identifier for valid cells;

a memory, an output of the ATM cell evaluation circuit being linked to the memory;

a clock-pulse burst generator, the clock-pulse generator connected to the memory to receive a signal from the memory and having a clock-pulse burst output for connection to a data measuring receiver;

a parallel-to-serial converter connected to the memory, the parallel-to-serial converter being timed and controlled by the clock-pulse burst generator and having a converter input and output, the converter input for receiving a shift/load signal from the clock-pulse burst generator; and a burst-data output for receiving data from the parallel-to-serial converter, the burst data output for providing burst data to the data measuring receiver.

15. The measuring tool as recited in claim 14 wherein the ATM cell evaluation circuit provides an input to the clock-pulse burst generator, the input being a function of the first block clock pulse.

16. The measuring tool as recited in claim 14 further comprising a clock pulse generator having a higher rate than the first block clock pulse, the clock pulse generator providing an input to the clock-pulse burst generator.

17. The measuring tool as recited in claim 14 wherein the measuring tool is an integrated circuit.

18. The measuring tool as recited in claim 14 wherein the measuring tool is part of an ATM measuring instrument.

19. The measuring tool as recited in claim 14 wherein the measuring tool is part of a data measuring instrument.

* * * * *